United States Patent
Bonino

(10) Patent No.: US 10,011,438 B2
(45) Date of Patent: Jul. 3, 2018

(54) OBJECT ORIENTING MACHINE

(71) Applicant: BONINO S.P.A. CON UNICO AZIONISTA, Alessandria (IT)

(72) Inventor: Alessandro Bonino, Alessandria (IT)

(73) Assignee: BONINO S.P.A. CON UNICO AZIONISTA, Alessandria (IT)

( * ) Notice: Subject to any disclaimer, the term of this patent is extended or adjusted under 35 U.S.C. 154(b) by 0 days.

(21) Appl. No.: 15/115,135

(22) PCT Filed: Feb. 18, 2014

(86) PCT No.: PCT/IT2014/000040
§ 371 (c)(1),
(2) Date: Jul. 28, 2016

(87) PCT Pub. No.: WO2015/125161
PCT Pub. Date: Aug. 27, 2015

(65) Prior Publication Data
US 2016/0340130 A1 Nov. 24, 2016

(51) Int. Cl.
*B65G 29/00* (2006.01)
*B65G 47/34* (2006.01)
*B65G 47/14* (2006.01)

(52) U.S. Cl.
CPC ......... *B65G 47/34* (2013.01); *B65G 47/1471* (2013.01)

(58) Field of Classification Search
USPC .................................. 198/393, 396, 397.01
See application file for complete search history.

(56) References Cited

U.S. PATENT DOCUMENTS

| | | |
|---|---|---|
| 2,810,467 A | 10/1957 | Bogaty |
| 3,724,656 A | 4/1973 | Sterling |
| 3,942,541 A * | 3/1976 | Dupuy .................. G07D 9/008 453/56 |
| 5,394,972 A | 3/1995 | Aidlin et al. |
| 5,586,637 A | 12/1996 | Aidlin et al. |
| 7,972,088 B2 * | 7/2011 | Dotson .............. B65G 47/1471 198/397.03 |

FOREIGN PATENT DOCUMENTS

| | | |
|---|---|---|
| EP | 0 298 535 A1 | 1/1989 |
| EP | 1 582 484 A1 | 10/2005 |
| EP | 2 196 417 A1 | 6/2010 |
| WO | 2006/045927 A1 | 5/2006 |

OTHER PUBLICATIONS

International Search Report and Written Opinion of the International Searching Authority for corresponding International Patent Application No. PCT/IT2014/000040 dated Nov. 24, 2014, 11 pg.

* cited by examiner

*Primary Examiner* — Gene O Crawford
*Assistant Examiner* — Lester Rushin, III
(74) *Attorney, Agent, or Firm* — Merchant & Gould P.C.

(57) ABSTRACT

A machine (1) for orienting objects (T) includes a hopper (2) for receiving the objects (T) in bulk and a belt conveyor (3) with a plurality of small blades to withdraw the objects (T) from the hopper (2). The belt conveyor (3) has an ascending length (5) suitable to select the objects (T) having a predetermined orientation, so that, at the upper end of the ascending length (5) only the objects (T) having all the same predetermined orientation are present on the belt conveyor (3). The small blades form a rest surface facing upwardly in the ascending length (5) and have a plurality of reliefs suitable to prevent free rolling of the objects (T) rested on the rest surface.

14 Claims, 5 Drawing Sheets

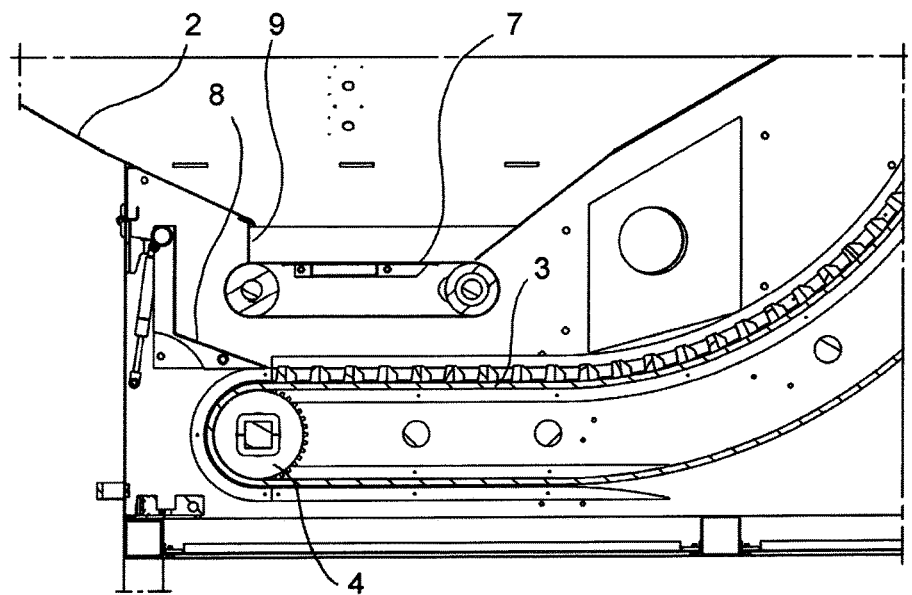
FIG. 6
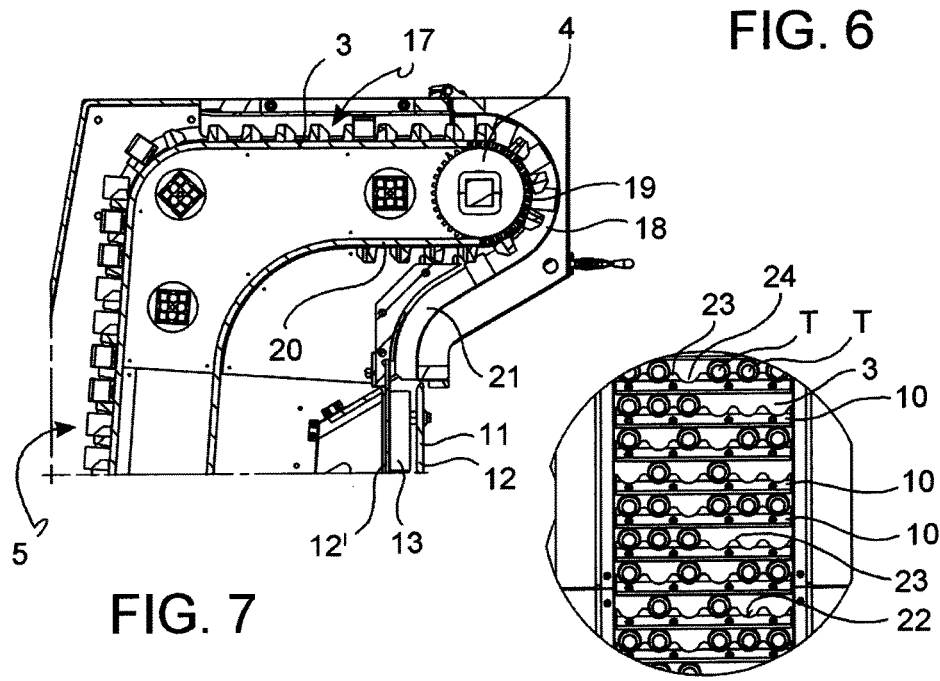
FIG. 7
FIG. 8

OBJECT ORIENTING MACHINE

This application is a National Stage Application of PCT/IT2014/000040, filed 18 Feb. 2014, and which application is incorporated herein by reference. To the extent appropriate, a claim of priority is made to the above disclosed application.

BACKGROUND OF THE INVENTION

The present invention relates to an object orienting machine, particularly caps or capsules, provided with an improved object selection function.

Machines for orienting objects are known, in which the objects are received in bulk in a hopper from which they are withdrawn and fed to a device configured to orient the exiting objects all in the same manner.

Such known machines are widely used, for example, for orienting caps, such as plastic caps, crown caps, and the like, in bottling lines.

The known devices for orienting caps comprise a belt conveyor with small planar blades, oriented perpendicularly to the surface of the same belt, passing through the hopper containing the objects to be oriented and afterwards it follows a substantially vertical ascending path. The objects are withdrawn from the hopper by virtue of the perpendicular small blades and, in the ascending length of the belt conveyor, the objects remain rested on the small blades, acting as support bases. The arrangement of the belt conveyor and the dimensions of the small blades are selected so that only the properly oriented objects (i.e., in the preset manner) maintain a stable balance on the small blades and continue the ascending path on the belt conveyor, while the improperly oriented objects (i.e., not in the preset manner) fall back to the hopper beneath.

In such a manner, at the end of the ascending length of the belt conveyor, only the properly oriented objects are still present on the belt.

At this point, the properly oriented objects are withdrawn from the belt conveyor and directed towards the successive stations of the manufacturing line, for example, towards a bottling station in the case where said objects are caps.

Machines for orienting objects of the type described above are known, for example, from the documents WO 2006/045927, U.S. Pat. No. 5,394,972, U.S. Pat. No. 5,586,637 and EP2196417.

In some of the known devices, the withdrawal of the objects at the end of the ascending length of the belt conveyor occurs by virtue of the use of a pneumatic system, which allows generating a fluid jet (for example, air) under pressure to push the objects laterally out of the belt conveyor, towards conveying means to the successive station of the manufacturing line.

In other known devices, the withdrawal of the objects occurs by falling, i.e., under the action of the force of gravity in a zone behind the ascending side of the bladed belt conveyor.

However, the object orienting efficiency by gravitational selection by an ascending bladed belt is very sensitive to the shape of the object to be oriented. In fact, such technology is indicated only for capsules or caps with a diameter that is larger than their height, for example with a ratio Ø:H=2:1. (The cap could have a diameter of 30 mm and a height of 15 mm), because in this case the object barycenter is very near to the ascending belt plane, stabilizing the position of the rested objects having the desired orientation both during the selection step and during the withdrawal of the objects from the belt.

The orientation of "tall" caps, i.e., with a height that is higher than their diameter, by a gravitational selection with a bladed belt would require an enlargement of the planar small blade so as to obtain again the desired relative positioning between the object barycenter, the ascending plane of the belt, and the resting plane of the small blade (as shown in the FIGS. 1 and 2).

However, due to the intrinsic instability of the "tall" caps in a dynamic system, the "tall" cap tends to roll and rotate on the small blade, as shown in FIG. 3, and it would remain in any case rested on the enlarged small blade. This results in a mispositioning of the single rotated cap and the risk of a domino effect on the adjacent caps rested on the same small blade, thus amplifying the phenomenon up to the arrest of the system.

This prevents even now the use on an industrial scale of the gravitational selection by means of a bladed belt for "tall" caps.

SUMMARY OF THE INVENTION

A main object of the present invention is to provide an object orienting machine that is free from the drawbacks of the prior art and allows orienting also those objects with shapes other than a "low cylinder", particularly "tall" caps and capsules in a non-cylindrical shape, for example, a frusto-conical shape.

A particular object of the invention is to provide an object orienting machine, which prevents rollings or rotations of the objects rested on the small blades of the bladed belt.

In accordance with an aspect of the invention, an object orienting machine comprises a hopper for receiving the objects in bulk, a belt conveyor with a plurality of small blades to withdraw the objects from the hopper, in which the belt conveyor has an ascending length suitable to select the objects having a predetermined orientation, so that, at the upper end of the ascending length, only the objects having all the same predetermined orientation are present on the belt conveyor, as well as a withdrawing device, arranged downstream of the ascending length of the belt conveyor, to extract the objects from the machine, in which the small blades form a rest surface facing upwardly in the ascending length of the belt conveyor and having a plurality of reliefs suitable to prevent a free rolling of the objects rested on said rest surface.

By virtue of the reliefs, the "tall" caps are held laterally preventing them from rotating (see FIGS. 11, 12), and thus obviating the problems discussed with reference to the prior art.

In accordance with an aspect of the invention, the rest surface may form a plurality of seats or frontally open half-alveoli (in other terms: on the side opposite the side of the belt) and upwardly, in which the sides or side depressions of the seats form the above-mentioned reliefs. In this manner, the rest surface does not hinder neither the receiving on the small blades of the bulk objects in the hopper, nor the desired fall of the misoriented objects from the belt.

Those skilled in the art will appreciate that the configuration of the rest surface with reliefs could be employed also for "short" caps that have not rotation problems (see FIG. 14).

In accordance with a further aspect of the invention, the extraction device is configured to separate/detach the objects with the predetermined orientation from the rest surface in a detachment direction that:

substantially coincides with a movement direction of the belt conveyor at the detachment moment, or is transversal, for example, perpendicular or inclined with respect to the plane of the belt conveyor at the detachment moment.

In this manner, the reliefs cannot hinder the withdrawal of the oriented objects.

In accordance with a further aspect of the invention, the extraction device is configured so as to carry out the detachment of the oriented objects from the small blades and the withdrawal thereof from the belt conveyor by gravitational fall in a descending length of the belt conveyor.

In accordance with a further aspect of the invention, the seats or the half-alveoli formed by the rest surface may widen from a minor base adjacent to the belt conveyor up to a major base that is open at a front free edge of the small blade, in order to receive objects having a non-cylindrical shape, for example, objects with a frusto-conical portion, such as capsules for coffee or other beverages.

BRIEF DESCRIPTION OF THE DRAWINGS

In order to better understand the present invention and appreciate the advantages thereof, some exemplary, non-limiting embodiments thereof will be described herein below, with reference to the Figures, in which:

FIGS. 6, 7 and 8 are enlarged views of details in FIG. 5;

DETAILED DESCRIPTION OF THE DRAWINGS

With reference to the Figures, the invention will be described herein below with reference to a machine 1 for orienting caps T, in particular plastic caps having a cylindrical shape that are closed at one of the bases. However, the principles of the invention similarly apply also to different objects, for example, capsules for beverages, with a shape not necessarily cylindrical, e.g., frusto-conical, polygonal, bulging, etc.

Figure 1:
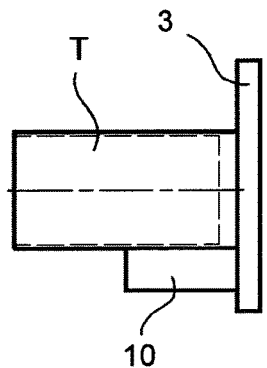
FIG. 1 is a longitudinal sectional view of a portion of a bladed belt conveyor of the prior art with a cylindrical object rested.
Figure 2:
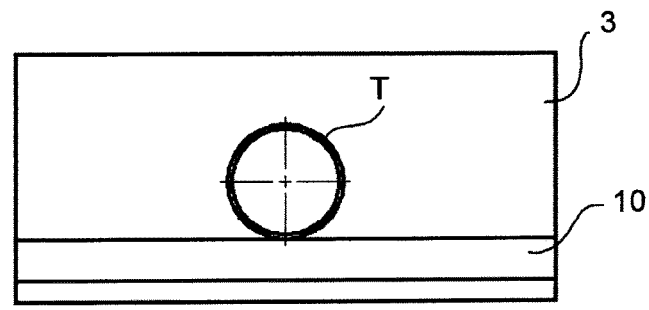
FIG. 2 is a front view of the portion of bladed belt conveyor in FIG. 1.
Figure 3:
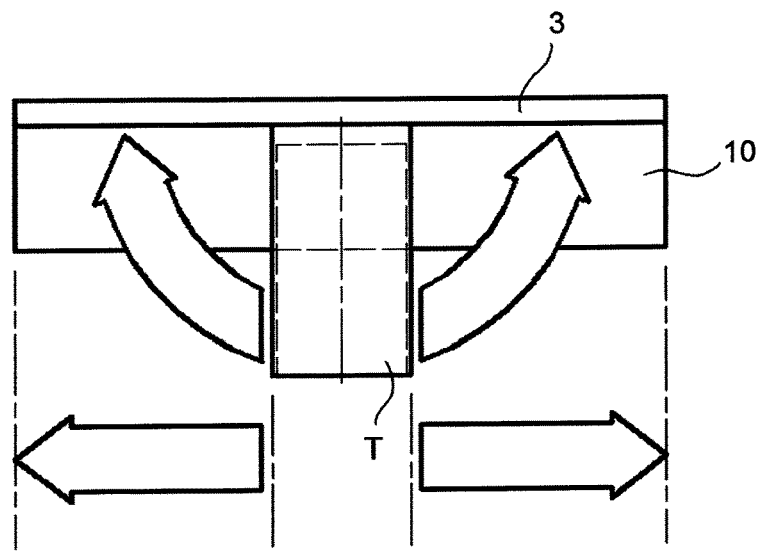
FIG. 3 illustrates the possibility of undesired rolling and rotation of an object rested on a belt conveyor of an orienting machine of the prior art.
Figure 4:
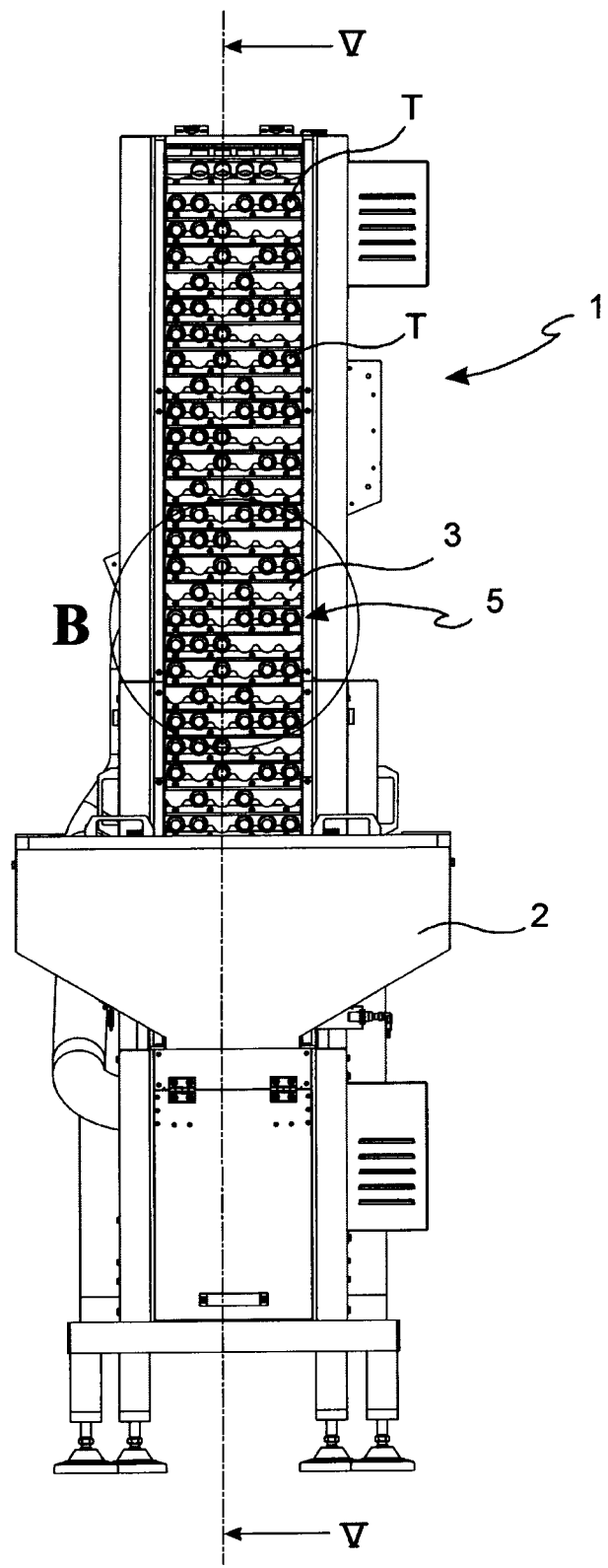
FIG. 4 is a front view of an object orienting machine according to the invention.
Figure 5:
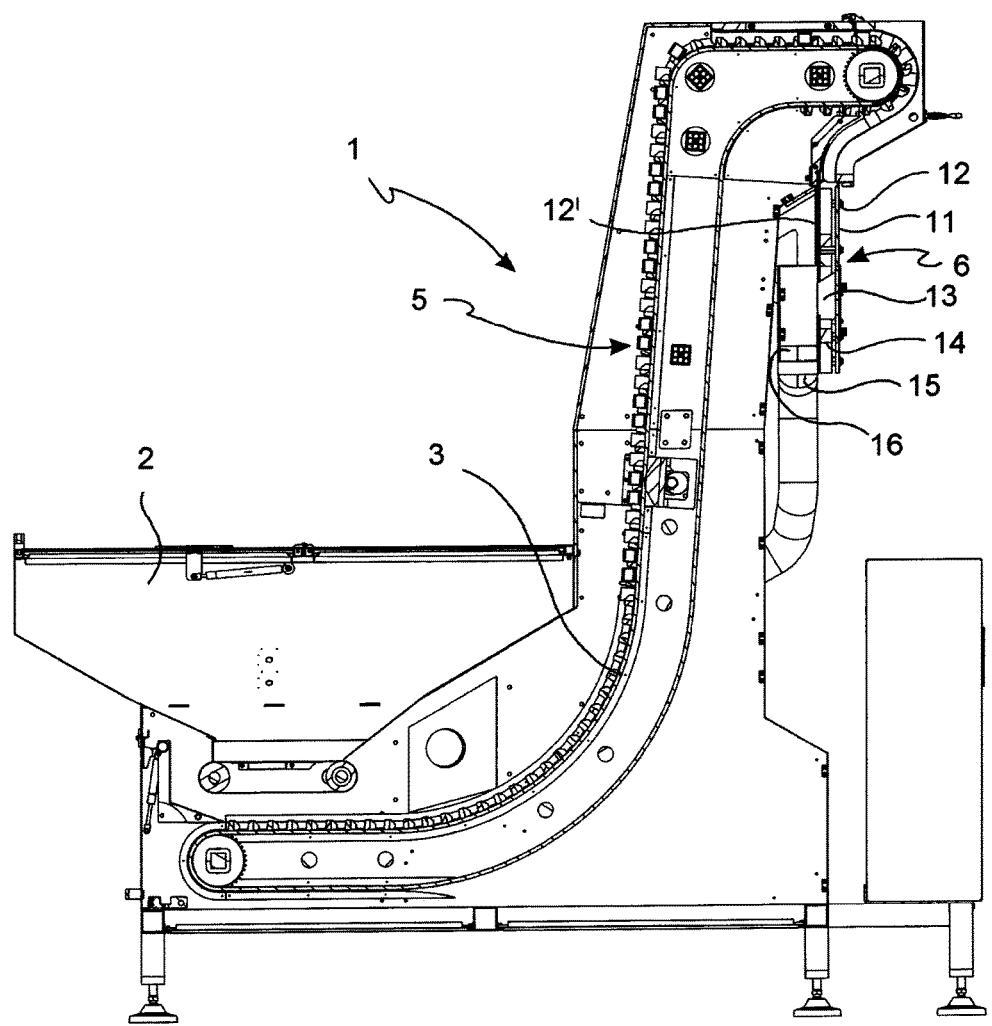
FIG. 5 is a sectional view according to the plane V-V in FIG. 4.
Figure 9:
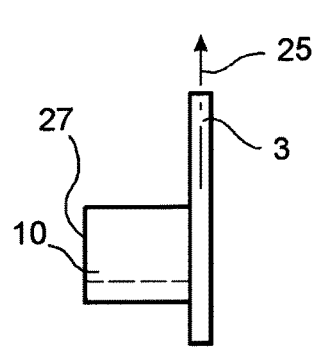
FIG. 9 is a longitudinal sectional view of a portion of a bladed belt conveyor according to an embodiment of the invention.
Figure 10:
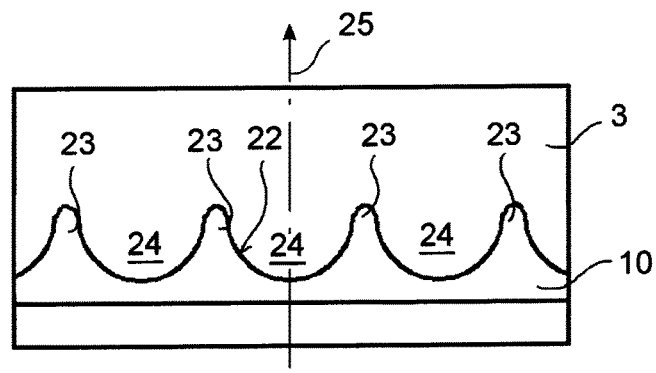
FIG. 10 is a front view of the portion of bladed belt conveyor in FIG. 9.

FIGS. 4 and 5 show the machine 1 for orienting caps T on the whole. The machine 1 comprises a hopper 2 receiving the caps T in bulk, a belt conveyor 3, set in motion by a pinion shaft 4, which withdraws the caps from the hopper 2 and which comprises an ascending length 5 for providing for the selection of the properly oriented caps T, as well as an extraction device 6, arranged downstream of the ascending length 5 (as seen in the movement direction 25) of the belt conveyor 3, providing for the withdrawal of the caps T from the machine 1 and the conveying thereof towards the successive stations of the manufacturing line.

With particular reference to FIG. 6, an endless belt 7 is provided for on the bottom of the hopper 2 where the caps T are thrown in bulk, which operates in a continuous manner at a constant speed and drags the caps T towards a ramp 8 leading to the underlying belt conveyor 3.

By virtue of the presence of a mobile partition wall 9, it is possible to adjust the flow of the caps T exiting the hopper 2.

Small transversal blades 10 project from the belt conveyor 3, perpendicular or inclined with respect to the surface (or, in other terms, the plane) of the same belt 3, and having a width substantially equal to the belt width, so that the caps T coming from the ramp 8 are brought to arrange on the belt 3 in compartments defined by two successive small blades 10, respectively.

Referring now to the FIGS. 4 and 5, once the caps T have been withdrawn from the hopper 2, the belt conveyor 3 extends along the above-mentioned ascending length 5, which allows the selection of the properly oriented caps T. Along the ascending length 5 of the belt conveyor 3, only those caps T the barycenter of which is nearest to the belt 3 surface continue the path, resting on the underlying small blade 10. On the contrary, those caps T the barycenter of which is farthest from the belt 3 surface fall back into the hopper 2 under the action of the force of gravity.

In the non-limiting example of plastic caps T with a cylindrical shape that are closed at one of the bases, only those caps the closed base of which is rested against the belt 3 have a barycenter sufficiently near to the belt 3 to be able to pass the selection, while all the other caps fall back into the hopper 3.

In this manner, in an upper portion or at the end of the ascending length 5 of the belt conveyor 3, only those caps T having all the same predetermined orientation are present on the belt conveyor 3.

The extraction device 6 is provided for at the end of the ascending length 5 of the belt conveyor 3, illustrated schematically in FIG. 5.

According to an aspect of the invention, the small blades 10 form a rest surface 22 (for the support of the objects T to be selected) facing upwardly in the ascending length 5 of the belt conveyor 3 and having a plurality of reliefs 23 suitable to prevent a free rolling of the objects T rested on said rest surface 22.

Figure 11:
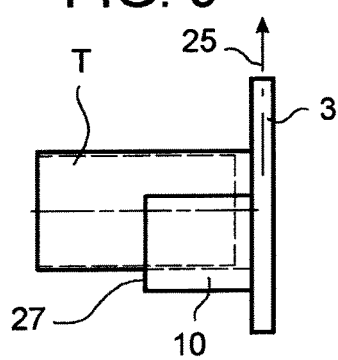
FIG. 11 is a longitudinal sectional view of a portion of a bladed belt conveyor with a "long" cylindrical cap rested, according to an embodiment of the invention.
Figure 12:
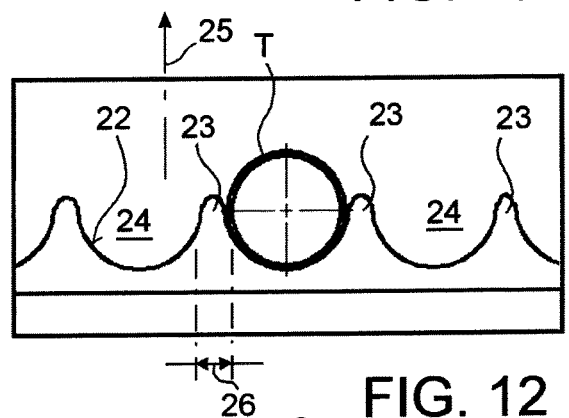
FIG. 12 is a front view of the portion of bladed belt conveyor in FIG. 11.

By virtue of the reliefs 23, the "tall" caps with a ratio of width or diameter and length that is equal to or less than 1 are held laterally, preventing them from rotating (as illustrated in the FIGS. 11, 12), thereby obviating the drawbacks discussed with reference to the prior art.

According to an embodiment, the rest surface 22 may form a plurality of cavities 24 or frontally open half-alveoli (in other terms: on the side opposite the side of the belt 3) and in the movement direction 25 of the belt 3, in which partition walls between two adjacent cavities form the above-mentioned reliefs 23. In this manner, the rest surface 22 does not hinder neither the reception of the objects T on the small blades 10, nor the desired fall of the misoriented objects from the small blades 10.

Figure 14:
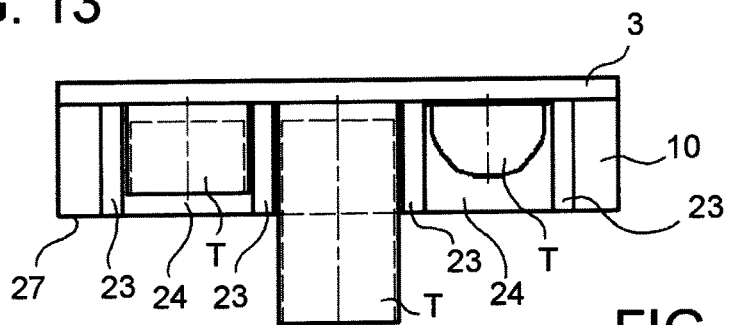
FIG. 14 is a cross-sectional view of the portion of bladed belt conveyor in FIG. 11 with rested objects having shapes that are mutually different.

Those skilled in the art will appreciate that the configuration of the rest surface 22 with reliefs 23 could be also employed for "short" caps, which do not have rotation problems (see FIG. 14).

Figure 13:
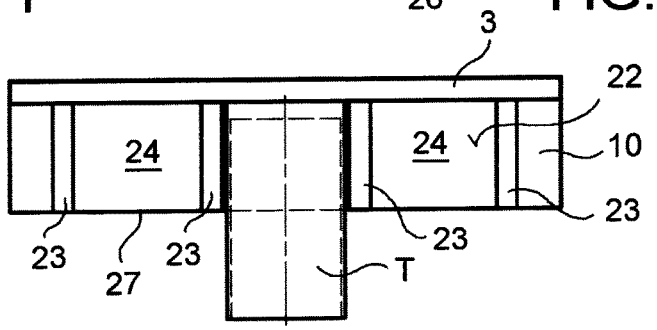
FIG. 13 is a cross-sectional view of the portion of bladed belt conveyor in FIG. 11.

According to an embodiment, the reliefs 23 of a same small blade form a plurality of ribs that are substantially mutually parallel and extending in a direction perpendicular to the plane of the belt 3, as seen in the cross-section of the belt 3, as illustrated in the FIGS. 13 and 14.

The ribs may be in a constant cross-sectional shape (in a sectional plane that is parallel to the plane of the belt 3). Alternatively, the width 26 of the ribs may decrease from a maximum width at the belt 3 up to a minimum width at the small blade 10 free edge.

The ribs may be in the cross-sectional shape (in a sectional plane that is parallel to the belt 3 plane):

of a cusp, preferably with a rounded vertex, or trapezoidal with the minor base facing in the movement direction 25 of the belt 3, or rectangular, possibly with a rounded free end (facing in the movement direction 25 of the belt 3).

Similarly, the cavities 24 or the half-alveoli formed by the rest surface 22 may widen from a minimum width adjacent to the belt conveyor 3 up to a maximum width at the free edge 27, in order to receive objects with a non-cylindrical shape, such as, for example, coffer capsules usually having a frusto-conical shape.

According to a further embodiment, the extraction device 6 is configured to separate/detach the objects with the predetermined orientation from the rest surface 22 in a detachment direction that:

substantially coincides with the movement direction 25 of the belt conveyor 3 at the detachment moment, or is transversal, for example, perpendicular or inclined with respect to the plane of the belt conveyor 3 at the detachment moment.

In this manner, the reliefs 23 cannot hinder the withdrawal of the oriented objects T.

Advantageously, as it will be described in detail herein below, the extraction device 6 is configured so as to carry out the detachment of the objects T from the small blades 10 and the withdrawal of the objects T from the belt conveyor 3 by gravitational fall, e.g., in a descending length 19 of the belt conveyor 3.

To this aim, the extraction device 6 may comprise a casing 11 comprising a first wall 12 and a second wall 12' opposite and facing the first wall 12, defining an interspace 13 therebetween, inside which the properly oriented caps T are let to fall downstream at the end of the ascending length 5 of the belt conveyor 3.

Within the casing 11, between the first wall 12 and the second wall 12', an inclined surface 14 is provided, onto which the caps T fall and roll or slide towards an output conduit 15, to be conveyed towards the successive stations of the manufacturing line.

In order to avoid obstructions in the case that the caps T get stacked in multiple overlapping rows on the inclined surface 14, an ejection conduit 16 may be arranged above the output conduit 15, through which those caps that have been possibly stacked above the caps taking the output conduit 15 are removed from the casing 11 and, preferably, brought to fall into the hopper 2.

FIG. 7 illustrates an embodiment of the connection member that allows the caps T passing from the top of the ascending length 5 of the belt conveyor 3 to the extraction device 6. A substantially horizontal length 17 comes after the ascending length 5 of the belt conveyor 3. A confinement carter 18 is provided for starting from the horizontal length 17, which is arranged along (e.g., parallel to) the belt conveyor 3 and follows the profile thereof, at a distance from the belt 3 that is sufficiently reduced to prevent the caps T from escaping their position.

A "C"- or 'U'-shaped return length 19 comes after the horizontal length 17, at the end of which the caps T, rather than on the belt conveyor 3, rest on or are guided by the confinement carter 18 and are dragged thereon by the small blades 10.

The return length 19 may be followed by a second horizontal length in the zone indicated by the reference 20. Downstream of the return length 19, a funnel or falling length 21 starts from the carter 18, in which the caps T, which are not held anymore by the small blades 10, enter, thereby falling within the casing 11 of the extraction device 6, and particularly within the interspace 13 between the first 12 and the second 12' walls of the casing 11, as described above.

It is apparent that any other type of connection that allows the caps T falling within the extraction device casing, while continuing to be properly oriented, may be equally used.

However, it shall be noticed that, by virtue of a connection member of the type described above, it is possible to position the extraction device 6 substantially aligned with the ascending length 5 of the belt conveyor 3 and the shoulders thereof, with the result that the machine 1 is particularly compact and with reduced overall dimensions.

Those skilled in the art, with the aim of meeting contingent, specific needs, will be able to make further modifications and variations, all of which anyhow falling within the protection scope as defined in the appended claims.

The invention claimed is:

1. A machine for orienting objects, comprising:
   a hopper for receiving the objects in bulk,
   a belt conveyor with a plurality of blades to withdraw the objects from the hopper, the belt conveyor having an ascending length suitable to select the objects having a predetermined orientation, so that, at the upper end of the ascending length only the objects having all the same predetermined orientation are present on the belt conveyor,
   an extraction device, arranged downstream of the ascending length of the belt conveyor, to extract the objects from the belt,
   wherein the blades form a rest surface facing upwardly in the ascending length and having a plurality of projections suitable to prevent a free rolling of the objects rested on said rest surface; and
   wherein the rest surface forms a plurality of cavities open on a side opposite the belt conveyor and open in a movement direction of the belt, wherein said projections form partition walls between two neighboring cavities.

2. The machine according to claim 1, wherein the cavities widen from a minimum width adjacent to the belt conveyor up to a maximum width at a free edge of the blade.

3. The machine according to claim 1, wherein the extraction device is configured to detach the objects from the rest surface in a detachment direction that substantially coincides with a movement direction of the belt conveyor at a detachment moment.

4. The machine according to claim 1, wherein the extraction device is configured to detach the objects from the rest surface in a detachment direction transverse to a plane of the belt conveyor at a detachment moment.

5. The machine according to claim 1, wherein the extraction device is configured to carry out detachment of the objects from the blades and withdrawal of the objects from the belt conveyor by gravitational fall of the objects.

6. A machine for orienting objects, comprising:
a hopper for receiving the objects in bulk,
a belt conveyor with a plurality of blades to withdraw the objects from the hopper, the belt conveyor having an ascending length suitable to select the objects having a predetermined orientation, so that, at the upper end of the ascending length only the objects having all the same predetermined orientation are present on the belt conveyor,
an extraction device, arranged downstream of the ascending length of the belt conveyor, to extract the objects from the belt,
wherein the blades form a rest surface facing upwardly in the ascending length and having a plurality of projections suitable to prevent a free rolling of the objects rested on said rest surface; and
wherein the projections of a same blade form a plurality of ribs that are substantially mutually parallel and extending in a direction perpendicular to a plane of the belt, as seen in the cross-section of the belt.

7. The machine according to claim 6, wherein said ribs have a constant cross-sectional shape.

8. The machine according to claim 6, wherein the ribs have a width decreasing from a maximum width at the belt up to a minimum width at a free edge of the blade.

9. The machine according to claim 6, wherein the ribs are in a cross-sectional shape of:
a cusp with a rounded vertex facing a movement direction of the belt, or
trapezoidal with the minor base facing the movement direction of the belt, or
substantially rectangular.

10. The machine according to claim 6, wherein the extraction device is configured to detach the objects from the rest surface in a detachment direction that substantially coincides with a movement direction of the belt conveyor at a detachment moment.

11. A machine for orienting objects, comprising:
a hopper for receiving the objects in bulk,
a belt conveyor with a plurality of blades to withdraw the objects from the hopper, the belt conveyor having an ascending length suitable to select the objects having a predetermined orientation, so that, at the upper end of the ascending length only the objects having all the same predetermined orientation are present on the belt conveyor,
an extraction device, arranged downstream of the ascending length of the belt conveyor, to extract the objects from the belt,
wherein the blades form a rest surface facing upwardly in the ascending length and having a plurality of ribs suitable to prevent a free rolling of the objects rested on said rest surface, and wherein the plurality of ribs are substantially mutually parallel and extend in a direction perpendicular to a plane of the belt, as seen in the cross-section of the belt.

12. The machine according to claim 6, wherein the extraction device is configured to carry out detachment of the objects from the blades and withdrawal of the objects from the belt conveyor by gravitational fall of the objects.

13. A machine for orienting objects, comprising:
a hopper for receiving the objects in bulk,
a belt conveyor with a plurality of blades to withdraw the objects from the hopper, the belt conveyor having an ascending length suitable to select the objects having a predetermined orientation, so that, at the upper end of the ascending length only the objects having all the same predetermined orientation are present on the belt conveyor,
an extraction device, arranged downstream of the ascending length of the belt conveyor, to extract the objects from the belt,
wherein the blades form a rest surface facing upwardly in the ascending length, wherein the rest surface forms a plurality of cavities open on a side opposite the belt conveyor and open in a movement direction of the belt, said rest surface having a plurality of partition walls between two neighboring cavities suitable to prevent a free rolling of the objects rested on said rest surface.

14. The machine according to claim 6, wherein the extraction device is configured to detach the objects from the rest surface in a detachment direction transverse to a plane of the belt conveyor at a detachment moment.

\* \* \* \* \*